US005626016A

United States Patent [19]
Walter

[11] Patent Number: 5,626,016
[45] Date of Patent: May 6, 1997

[54] WATER HAMMER DRIVEN VIBRATOR HAVING DEFORMABLE VIBRATING ELEMENTS

[76] Inventor: Bruno H. Walter, 902 Wentworth Avenue, North Vancouver, British Columbia, Canada, V7R 1R7

[21] Appl. No.: 329,718

[22] Filed: Oct. 26, 1994

Related U.S. Application Data

[63] Continuation-in-part of Ser. No. 936,032, Aug. 25, 1992, Pat. No. 5,459,699.

[51] Int. Cl.$^6$ ..................................... F15B 21/12
[52] U.S. Cl. ........................... 60/532; 91/50; 91/321; 92/92
[58] Field of Search ................... 91/50, 321; 92/92, 92/91; 60/532

[56] References Cited

U.S. PATENT DOCUMENTS

| | | |
|---|---|---|
| 2,647,846 | 8/1953 | Bagno ........................... 367/142 |
| 3,013,502 | 12/1961 | Fay ................................... 91/50 |
| 3,020,720 | 2/1962 | Spalding ........................ 60/532 |
| 3,369,519 | 2/1968 | Bricout . |
| 3,376,949 | 4/1968 | Baker et al. . |
| 3,409,470 | 11/1968 | Karpovich . |
| 3,536,157 | 10/1970 | Anstey . |
| 3,690,403 | 9/1972 | Davis . |
| 3,703,853 | 11/1972 | Steger ............................ 92/91 |
| 3,764,965 | 10/1973 | McLean et al. . |
| 4,131,178 | 12/1978 | Bouyoucos . |
| 4,252,210 | 2/1981 | Sodich . |
| 4,271,925 | 6/1981 | Burg . |
| 4,396,088 | 8/1983 | Bayhi . |
| 4,488,473 | 12/1984 | Gammon ....................... 91/50 |
| 4,523,901 | 6/1985 | Schippers et al. ............ 91/50 |
| 4,713,277 | 12/1987 | Akiyama et al. ............ 428/131 |
| 4,830,122 | 5/1989 | Walter . |
| 5,009,272 | 4/1991 | Walter . |
| 5,085,783 | 2/1992 | Feke et al. .................. 210/748 |
| 5,129,320 | 7/1992 | Fadner ......................... 101/365 |

FOREIGN PATENT DOCUMENTS

| | | |
|---|---|---|
| 1359616 | 3/1964 | France . |
| 620483 | 10/1935 | Germany . |
| 510300 | 4/1976 | Russian Federation . |
| 768482 | 10/1980 | Russian Federation ........ 92/92 |

*Primary Examiner*—F. Daniel Lopez
*Attorney, Agent, or Firm*—Oyen Wiggs Green & Mutala

[57] ABSTRACT

The invention provides a vibrator which may be used to vibrate industrial apparatus such as a conveyor, hopper, bin, screen, shaker table, or to agitate a fluid. The vibrator has a element comprising a concave outer skin on one side and a convex outer skin on the other side which define between them a cavity. The cavity is connected to a hydraulic driving circuit which provides a continuous series of high pressure pulses. Each pulse causes the deformable element to change shape. The continuous application of a series of pulses causes the deformable element to continuously vibrate. The high pressure pulses are generated by creating a water hammer within a conduit by means of a valve which can be rapidly opened and closed to allow fluid to flow through the conduit and then suddenly block the fluid flow. The vibrating apparatus may be used to shake industrial structures such as shaking screens, shaking tables, hoppers, bins or the like.

8 Claims, 7 Drawing Sheets

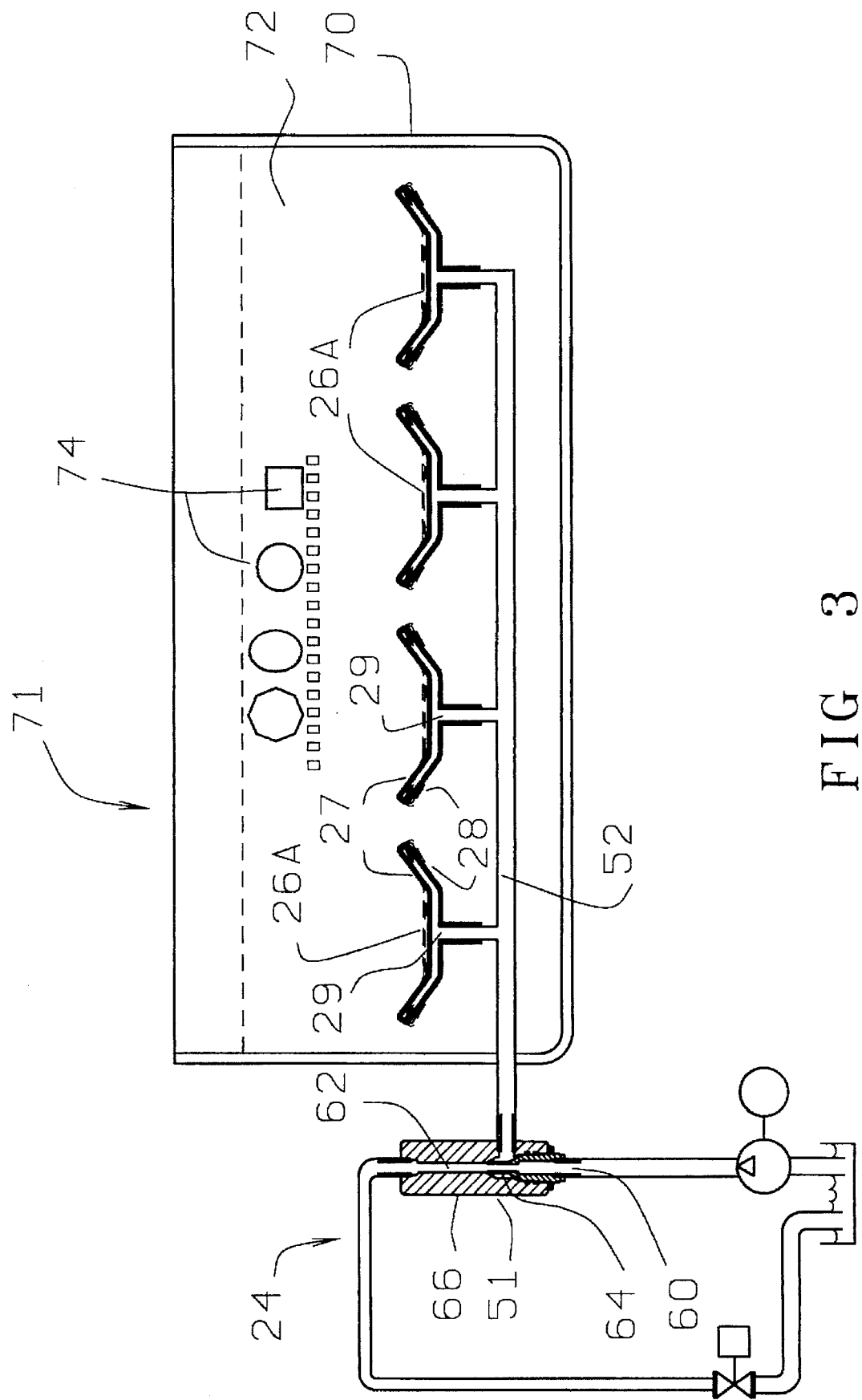

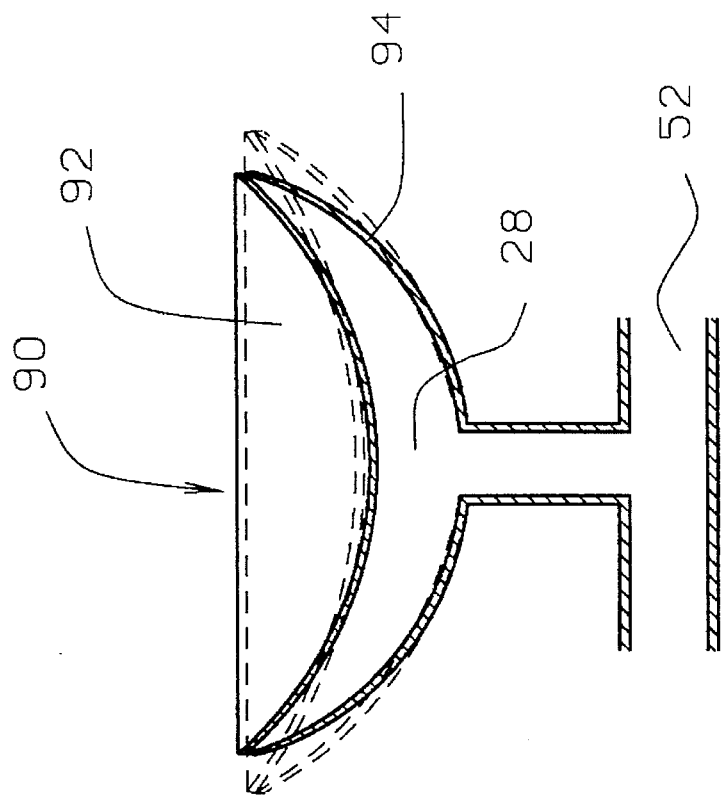
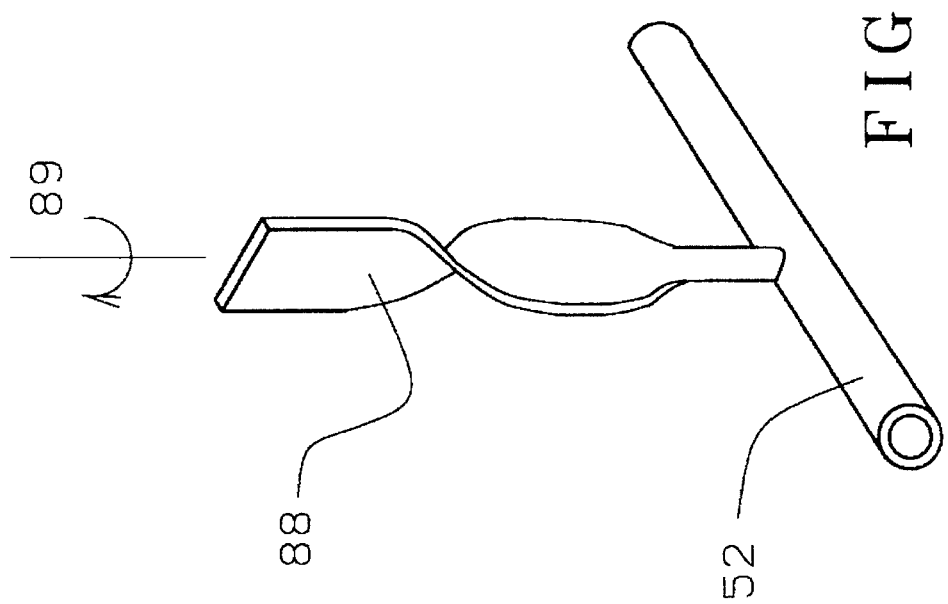
FIG 7
FIG 6

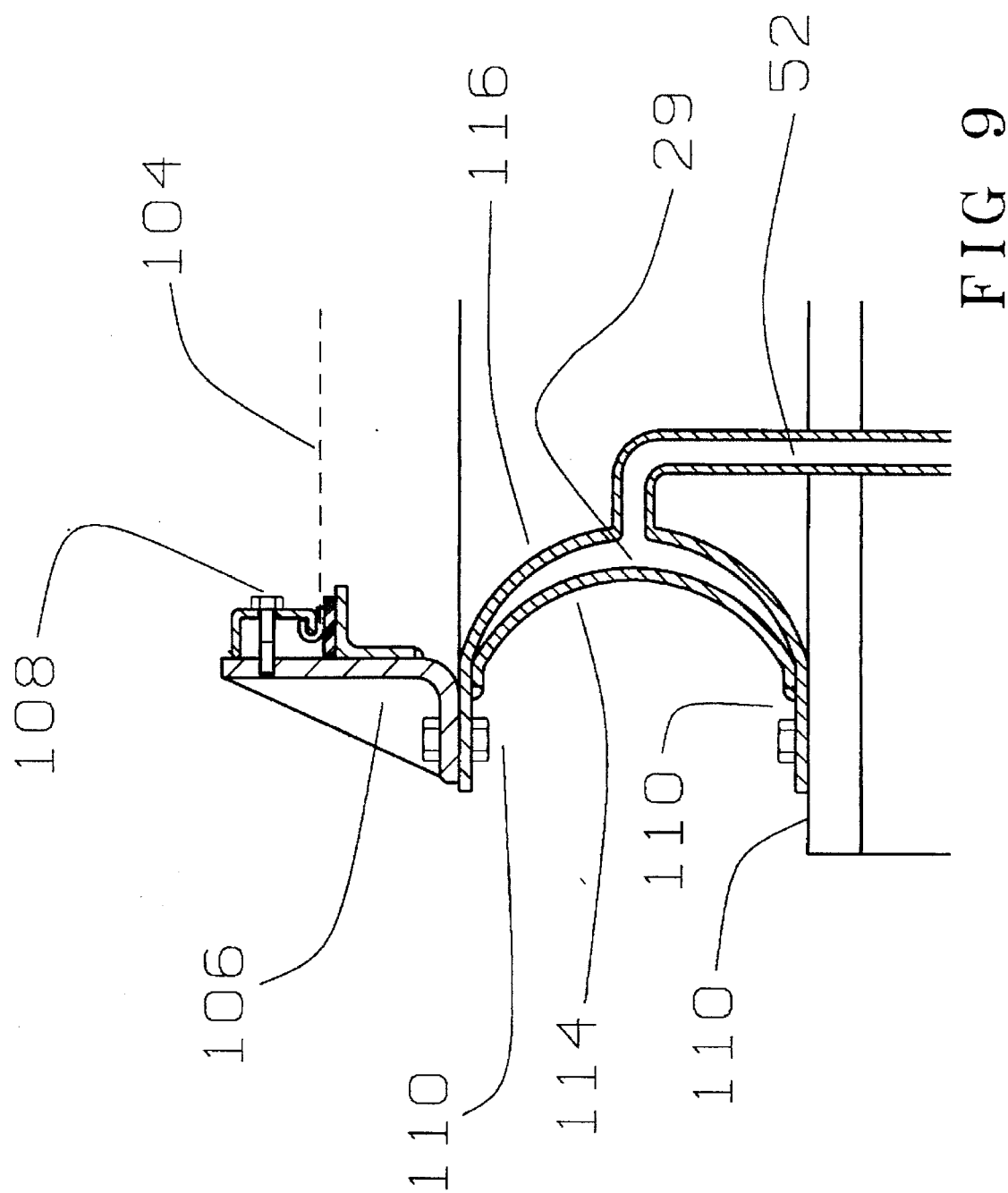

WATER HAMMER DRIVEN VIBRATOR HAVING DEFORMABLE VIBRATING ELEMENTS

CROSS REFERENCE TO RELATED APPLICATIONS

This application is a continuation in part of patent application, Ser. No. 07/936,032, filed Aug. 25, 1992 now U.S. Pat. No. 5,459,699, and titled METHOD AND APPARATUS FOR GENERATION OF HIGH ENERGY ACOUSTIC PULSES.

FIELD OF THE INVENTION

This application relates to devices for shaking industrial devices or structures. The structure may be the wall of a hopper or bin, a screen for separating finer particles from coarser particles, a shaker table, a fin for agitating or stirring a liquid, or the like.

BACKGROUND OF THE INVENTION

Vibrators are used in many industrial applications where it is necessary to shake a structure or device with high amplitude vibrations. For example, vibrators are used to: shake screens for separating particles, such as crushed rock, by size; to vibrate bins and hoppers to prevent granular particles from "bridging" and to help granular particles flow; and to vibrate pieces of machinery, such as steam rollers. Various types of vibrators are currently available. All of these vibrators have disadvantages.

Many prior art vibrators cause vibration by turning an unbalanced rotor with an electric or hydraulic motor or by compressed air. These vibrators tend to be expensive because they require precision heavy-duty bearings and/or are inefficient at converting input energy into vibrational energy.

Water hammer is a phenomenon by which high intensity pressure pulses are produced in a confined body of flowing liquid when the flow of the liquid is suddenly blocked. Water hammer is generally undesirable, and can be destructive. Much effort is spent in the design of plumbing systems to avoid water hammer. Water hammer pressure pulses have not been previously used to drive industrial vibrators. The mathematics of water hammer are discussed in various texts on fluid mechanics including *Fluid Mechanics (7th Edition)* Victor L. Streeter and E. Benjamin Wylie, McGraw-Hill Book Company, 1979 and R. L. Daugherty and J. B. Franzini, *Fluid Mechanics With Engineering Applications*, pages 425–431 McGraw Hill Book Company, 1977.

Water hammer has been used to generate acoustic pulses for use in marine seismic exploration. For example, Baker et al., U.S. Pat. No. 3,376,949, Anstey, U.S. Pat. No. 3,536,157 Burg, U.S. Pat. No. 4,271,925, Bricout, U.S. Pat. No. 3,369,519 and Davis, U.S. Pat. No. 3,690,403 disclose underwater acoustic generators, also for use in underwater seismic exploration. Each of these devices use a deliberately created water hammer to produce a one-shot high amplitude burst of acoustic signals appropriate for geophysical seismic exploration. Akimoff, German patent No. 620,483, discloses a siren for broadcasting noise into air wherein the noise is generated by a series of water hammers in a pipe.

Bayhi, U.S. Pat. No. 4,396,088 discloses a generator of low power, low frequency acoustic waves for seismic exploration. The Bayhi apparatus modulates the flow of fluid flowing into an array of flexible sleeves at the frequency of the desired sound. Bayhi does not disclose the use of water hammer and is not designed for or adapted to shake industrial machinery or structures.

SUMMARY OF THE INVENTION

This invention provides a vibrator suitable for use in industrial settings which uses water-hammer pressure pulses to shake a member. One aspect of the invention provides a vibrator comprising a driving system and a deformable element. The driving system comprises a conduit having an inlet and an outlet; a source of pressurized fluid connected to the conduit inlet; a valve in the conduit; and, a valve actuator associated with the valve for repeatedly opening and closing the valve to create a continuous series of water hammers in the conduit. The deformable element is upstream from said valve, and comprises a resilient deformable wall enclosing a fluid-filled volume, wherein a shape of said wall changes in response to changes in pressure inside said fluid-filled volume. The vibrator further comprises means for transmitting changes in a pressure in the conduit into the fluid-filled volume.

In a specific embodiment of the invention, the deformable element comprises a concave resilient wall and a convex resilient wall enclosing the fluid-filled volume.

BRIEF DESCRIPTION OF THE DRAWINGS

The invention will now be described with reference to the accompanying drawings which illustrate specific embodiments of the invention, but which should not be construed as restricting the spirit or scope of the invention in any way:

FIG. 3 is an elevational schematic view of apparatus for agitating a fluid which comprises a vibrating assembly according to the invention;

FIG. 6 is a perspective view of a twisted deformable element according to the invention;

FIG. 7 is a elevational section through a cup-shaped deformable element according to the invention;

DETAILED DESCRIPTION OF THE PREFERRED EMBODIMENT

Figure 1:
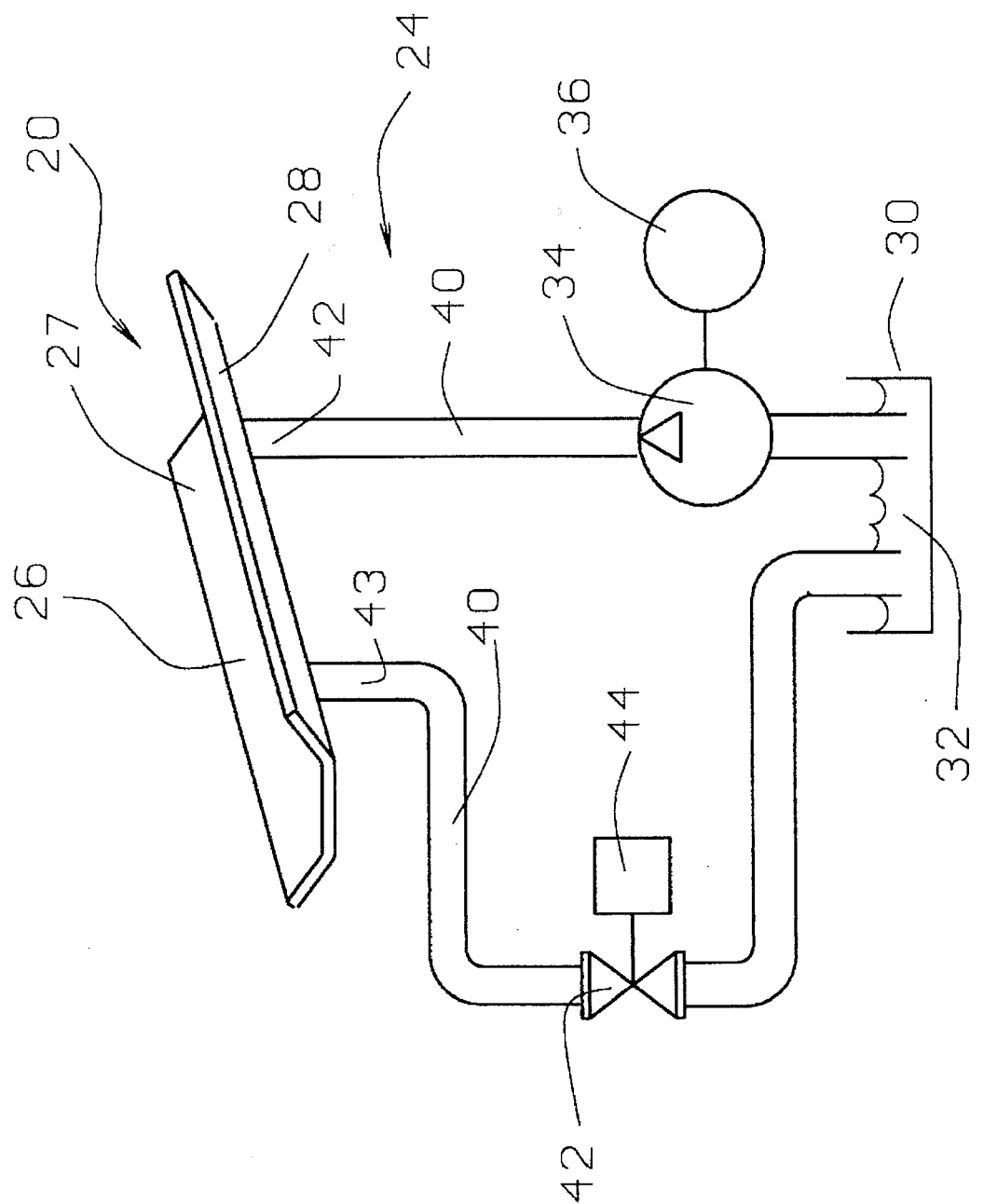
FIG. 1 is a schematic view of a vibrator according to the invention.

As shown in FIG. 1, this invention relates to a shaker assembly 20 which comprises a element 26 which changes shape in response to changes in pressure in a cavity within element 26. The pressure in a cavity 29 (FIG. 3) inside element 26 is caused to fluctuate by a hydraulic driving system 24. Hydraulic driving system 24 produces a continuous series of high pressure pulses which propagate into element 26 by deliberately creating a series of water hammers in a conduit 40.

There are many possible shapes for deformable elements which can be caused to vibrate by a series of high pressure water hammer pulses developed in a hydraulic driving system according to the invention. Some specific examples are described below. In general, deformable elements according to the invention have flexible resilient walls which enclose a non-spherical, non-cylindrical fluid-filled volume 29. When the pressure inside volume 29 is greater than the pressure outside of the element, the walls of the element change their shape.

A shape-changing element may be used directly to agitate or stir a fluid or may be used to vibrate members of a structure or machine. In the latter case, two members which are desired to be vibrated relative to each other may be attached by suitable means, such as bolting or welding, to points on the surface of the element which move relative to each other when the pressure in cavity 29 changes. Preferably the elements are shaped so that the change in the pressure in volume 29 produced by a small change in the volume of fluid inside chamber 29 produces a relatively large relative motion of points on the surface of the element. This can be accomplished, for example, by making the element U-shaped or shaped like a very thin crescent with one wall concave and one wall convex, when viewed from outside of the element. As the pressure inside chamber 29 increases the pressure flattens the concave wall. This forces the edges of the concave wall apart. Such an element can be used to shake a member by attaching the one edge of the concave wall to the member and the other edge of the concave wall to a fixed object.

Hydraulic driving system 24 comprises a reservoir 30 containing a working fluid 32 which is caused to flow through a conduit 40 at a significant velocity by a pump 34. Working fluid 32 may be, for example, hydraulic fluid or water. Working fluid 32 is preferably substantially incompressible and has a high cavitation threshold.

Pump 34, which is preferably a centrifugal pump, is driven by suitable driving means such as a electric motor 36. Conduit 40 is connected to an inlet 42 of element 26. Another section of conduit 40 returns to tank 30 from an outlet 43 of element 26. While hydraulic driving system 24 is described herein as a closed circuit. Hydraulic system 24 could also comprise an open circuit wherein working fluid 32 is simply discharged, or diverted to some other use, after exiting conduit 40. A closed circuit is generally preferable because it avoids wasting working fluid 32. Motor 36 may be any suitable driving means for pump 34 such as an electric motor.

The output pressure of pump 34 is typically in the range of 60 p.s.i. to 300 p.s.i. although the invention may also be practised with pressures outside of this range. The function of pump 34 and motor 36 is to provide a relatively high velocity flow of working fluid 32 through conduit 40 and valve 42. A suitable supply of flowing fluid 32 could also be obtained, for example, by gravity feed from an elevated reservoir, in which case, pump 34 and motor 36 would not be required at all.

A valve 42 is in conduit 40 downstream from element 26. Valve 42 has an open position in which the passage of working fluid 32 through valve 42 is substantially unimpeded and a closed position in which the flow of working fluid 32 through valve 42 is substantially blocked.

Valve 42 is operated by a suitable actuator 44 which is capable of suddenly moving valve 42 from its open position to its closed position. Valve 42 must be of a type which can be opened and closed at the desired frequency of operation of driving unit 24. For example, valve 42 may be a solenoid activated needle valve, a self-actuating valve operated by the flow of working fluid 32 or a cam-operated valve as described in my co-pending application Ser. No. 07/936,032.

In operation, pump 34 pumps working fluid 32 through conduit 40, cavity 29 in element 26 and valve 42 and back to tank 30 while valve 42 is held open by actuator 44. Valve 42 is then closed suddenly by actuator 44. The sudden closure of valve 42 blocks the flow of fluid 32 through conduit 40. This causes a water hammer inside conduit 40. The water hammer results in a high-pressure pulse which travels upstream in conduit 40 from valve 42. The high pressure results from the conversion of kinetic energy of the fluid flowing in conduit 40 to potential energy. When the high pressure water-hammer pulse reaches element 26, it causes the pressure within cavity 29 in element 26 to suddenly increase from a low static pressure to the high pressure of the water-hammer pressure pulse. The change in pressure within element 26 causes element 26 to deform, as is further described below.

In general, valve 42 need not completely block the flow of working fluid 32 in conduit 40 to create a water hammer but a more intense water hammer is created if valve 42 is closed completely and suddenly. In a typical application the pressure of the water hammer pulse is in the range of 500 p.s.i. to 1500 p.s.i.

The pressure of the water hammer pressure pulse is determined by the velocity V at which working fluid 32 is flowing in conduit 40 when valve 42 closes, the compressibility of working fluid 32, the speed at which valve 42 is closed, the degree of closure of valve 42 and the speed of sound in working fluid 42, among other factors. Under ideal circumstances, when valve 42 closes fully, the magnitude of the water hammer pressure pulse is given by:

$$p_h = e\ c_p V \tag{1}$$

where $p_h$ is the pressure of the water hammer pulse, p is the specific density of working fluid 32, and $c_p$ is the velocity at which the water hammer pulse travels in conduit 40. By increasing the velocity V of working fluid 32 in conduit 40, making the wall of conduit 40 rigid, and closing valve 42 completely and very quickly the pressure of the water hammer pulses generated by driving system 24 may be maximized.

Actuator 44 continuously opens valve 42, retains valve 42 open for a time sufficient for working fluid 32 to attain a significant velocity through valve 42 and suddenly closes valve 42 to create a continuous series of water hammer pressure pulses within conduit 40. Actuator 44 may comprise a solenoid controlled by an electronic timer or any other known mechanism for rapidly opening and closing valve 42. Actuator 44 may, for example, comprise the hydraulic circuit shown in FIGS. 3 and 4 of my co-pending application Ser. No. 08/277,250 filed 3 Oct. 1994 and entitled WATER-HAMMER ACTUATED CRUSHER which is incorporated herein by reference.

Figure 2:
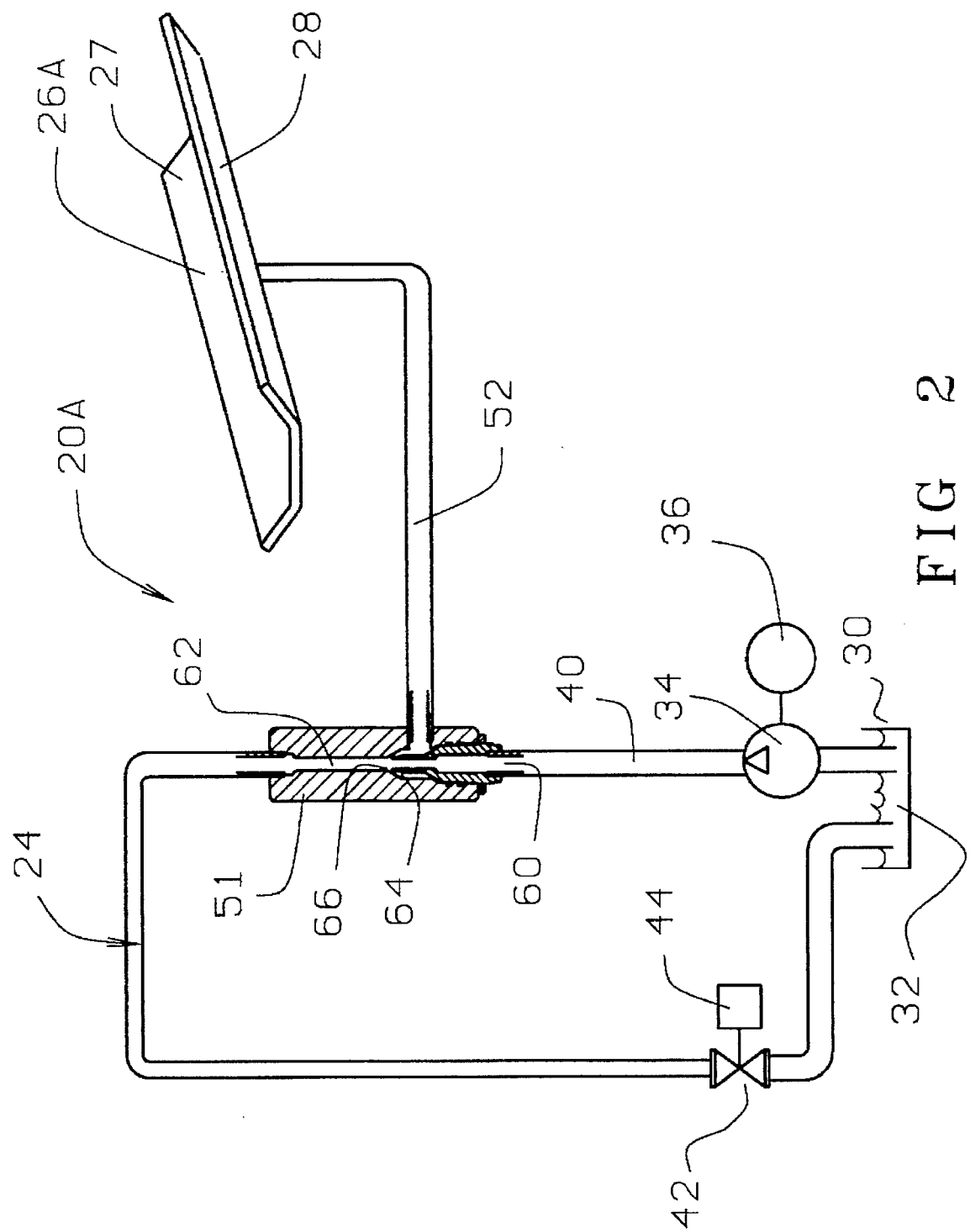
FIG. 2 is a schematic view of an alternative embodiment of a vibrator according to the invention.

FIG. 2 shows an alternative form of vibrator according to the invention. In FIG. 2 deformable element 26A is connected to conduit 40 through a branch conduit 52. Branch conduit 52 transmits high pressure pulses which are generated in conduit 40 by water hammer from conduit 40 into a chamber 29 within element 26A. The changes in pressure inside element 26A which are transmitted into chamber 29 by conduit 52 cause element 26A to deform as described below.

Water hammers are repeatedly created inside conduit 40 by cyclicly operating valve 42 by means of actuator 44. Each time a water hammer pulse is created within conduit 40, the water hammer pulse propagates upstream, through 40 and conduit 52 into transducer 26A. Element 26A is therefore maintained in a state of continuous vibration.

As shown in FIG. 2, conduit 52 is connected to conduit 40 by means of a venturi unit 51. Venturi unit 51 serves to increase the variation in the pressure in cavity 29 inside element 26A during each full cycle of operation of actuator 44. Venturi unit 51 comprises a nozzle 60 which is connected to pump 32 by conduit 40. Nozzle 60 expels working fluid 32 in a stream into a narrowed portion 62 inside the body of venturi unit 51. An annular cavity 64 surrounds nozzle 60. Annular cavity 64 is connected to narrow region 62 by a thin annular space 66 around the tip of nozzle 60. When valve 42 is open, the jet of fluid flowing from nozzle 60 into narrowed section 62 tends to draw fluid out from annular cavity 64. This tends to lower the pressure within annular cavity 64, conduit 52, and cavity 29 within element 26A. When working fluid 32 is flowing through venturi unit 51, venturi unit 51 acts like an aspirator or "jet pump". When valve 42 is suddenly closed to create a water hammer within conduit 40, a high pressure pulse travels upstream toward venturi unit 51. When the high pressure pulse reaches venturi unit 51, working fluid 32 stops flowing in venturi unit 51 and the high pressure pulse propagates through thin annular space 66 into conduit 52 and upstream into cavity 29 in element 26A. Venturi unit 51 may be replaced by a simple tee-junction without departing from the broad scope of the invention.

FIG. 3 shows a system 71 for agitating a liquid 72 held within a tank 70. System 71 comprises one or more vibrators according to the invention. The apparatus of FIG. 3 may be used, for example, to clean parts or other objects 74 immersed in fluid 72. The system of FIG. 3 includes a hydraulic driving circuit 24 which functions, as described above, and a plurality of elements 26A all connected to a conduit 52 which joins conduit 40 at a venturi unit 51.

High pressure pulses are generated by hydraulic driving system 24 as described above. When these pressure pulses arrive at chambers 29 within elements 26A through conduit 52, the increased pressure within chambers 29 distorts elements 26A as indicated in dashed outline in FIG. 3. The continuous flapping of elements 26A agitates and stirs fluid 72 within tank 70 to clean object 74.

Elements 26 and 26A described above each comprise a concave upper skin 27 and a convex lower skin 28 which define between them cavity 29. Upper and lower skins 27 and 28 are resilient so that elements 26 and 26A tend to return to their equilibrium shapes when the pressure inside chamber 29 is not affected by a water hammer pulse. Elements 26 and 26A change shape when the pressure inside chamber 29 is increased relative to the pressure outside of the element because a net outward pressure on the inside of upper concave surface 27 tends to cause upper surface 27 to flatten out. This, in turn, tends to force the upper edges of upper surface 27 outwardly. When the pressure is reduced, the configuration of element 26 returns to its static U-shaped configuration.

Figure 5:
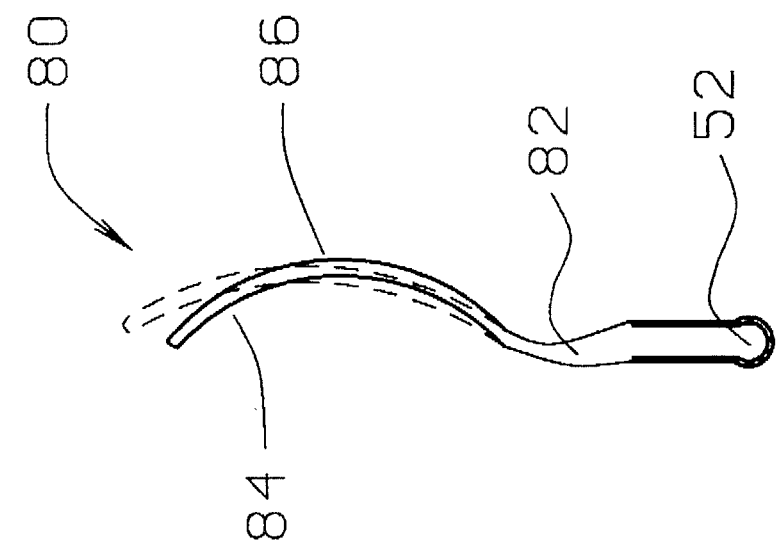
FIG. 5 is a side elevation of a section through the element of FIG. 4.
Figure 4:
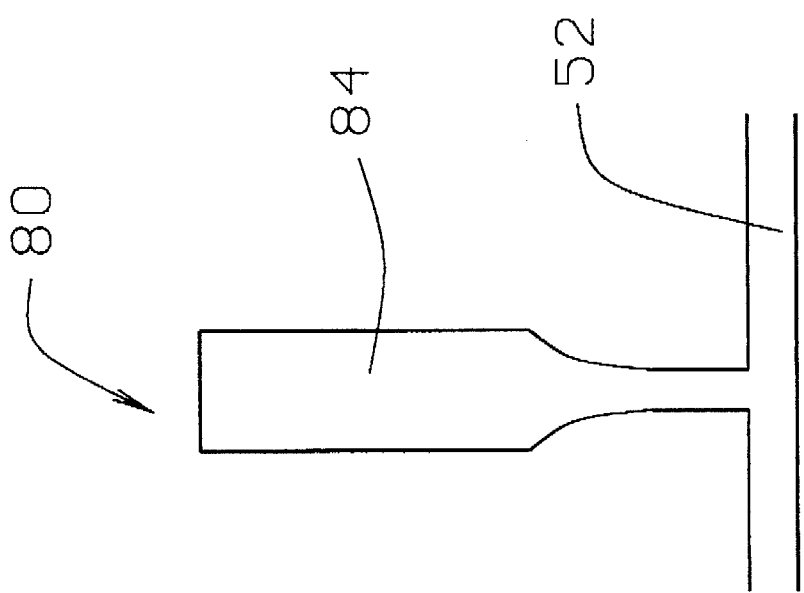
FIG. 4 is a front elevation of an alternative deformable element for use with the invention.

As noted above, there are many possible shapes for deformable elements which may be used in a water-hammer driven vibrator according to the invention. For example, FIGS. 4 and 5 show a element 80 having a concave front face and a convex rear face which may be used in a vibrator according to the invention. As shown in FIG. 5, when a high pressure pulse travelling along conduit 52 reaches the interior cavity 82 of element 80, then element 80 tends to straighten, as indicated in dashed outline in FIG. 5. FIG. 6 shows a element 88 which tends to "unscrew", as indicated by arrow 89, when a high pressure pulse enters a chamber within the element from conduit 52.

FIG. 7 shows yet another embodiment of deformable element which may be used with the invention. Deformable element 90 has the form of a circular cup with a concave upper skin 92 and a convex lower skin 94 defining between them a cavity 29. Cavity 29 is connected to a conduit 52. When the pressure within cavity 29 is increased by water hammer pulse travelling along conduit 52, then element as is deformed as indicated in dashed outline in FIG. 7. Deformable element 90 has only a small range of motion because of its circular geometry.

Figure 8:
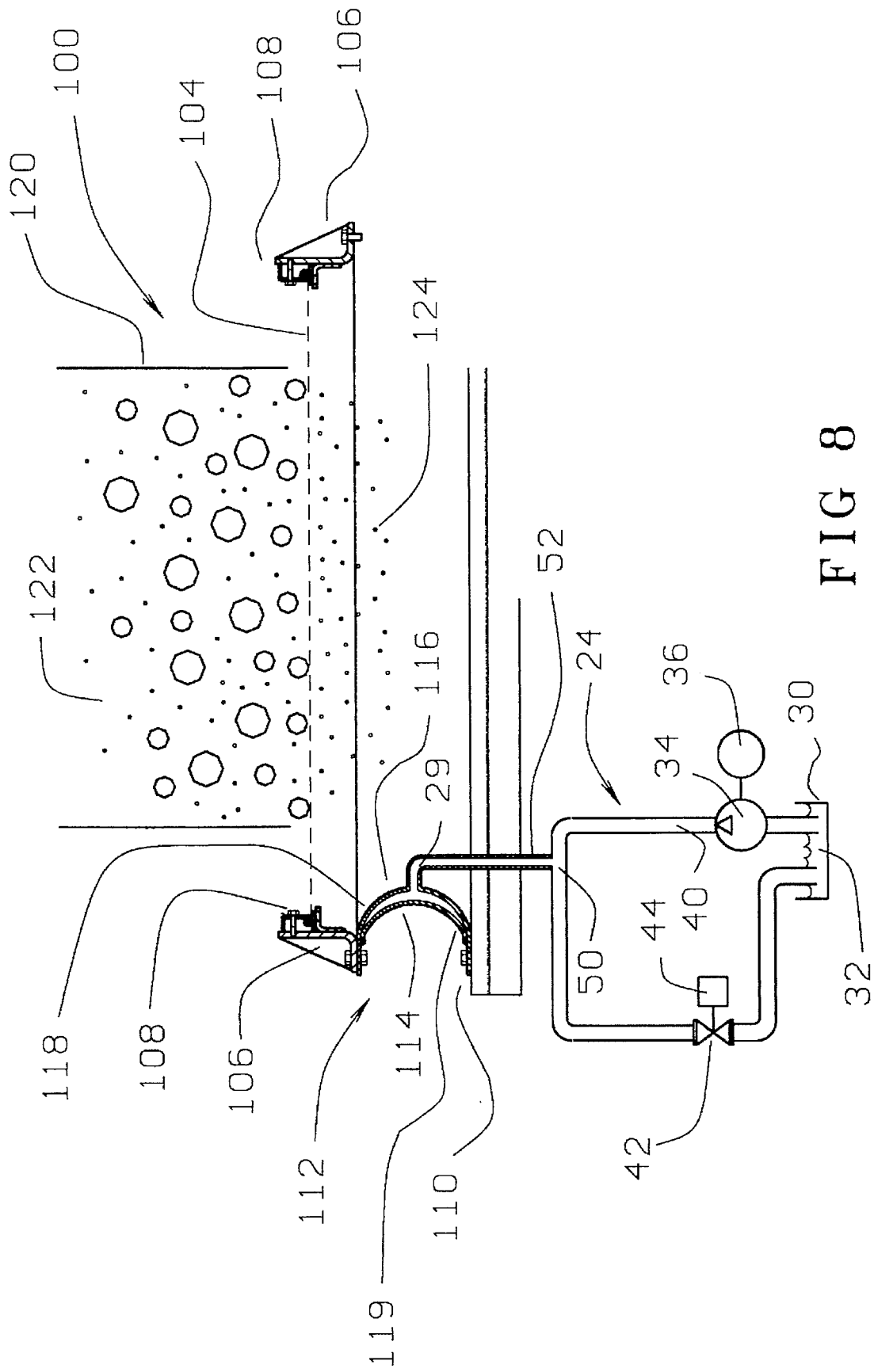
FIG. 8 is a section through a portion of a vibrating screen assembly incorporating a vibrator according to the invention; and, FIG. 9 is a detailed view of the deformable element of the vibrator from the shaking screen assembly of FIG. 8.

One or more deformable elements connected to a source of water hammer pressure pulses according to the invention may be attached to a member in a structure to cause the structure to vibrate. For example, FIG. 8 shows a vibrating screen 100 which may be used, for example, to separate fine gravel from crushed rock. Vibrating screen 100 is vibrated by a vibrator according to the invention. Screen 100 comprises a mesh 104 which is stretched between the sides of a frame 106 where it is held by clamping means 108. Frame 106 is shaken by one or more deformable elements 112 driven by one or more hydraulic driving circuits 24.

Hydraulic driving system 24 functions as described above. Hydraulic driving system 24 may be connected to conduit 52 by means of a tee junction 50 as shown in FIG. 8, or by means of a venturi unit 51 as described above.

A deformable element 112 is connected between frame 106 and a sub-frame 110. Deformable element 112 comprises a concave surface 114 and a convex surface 116 which, are joined at edges 118, 119 and between them, define a crescent-shaped cavity 29. The ends (not shown) of deformable element 112 are closed. Cavity 29 is in direct communication with conduit 52. One edge 118 of deformable element 112 is affixed, for example with bolts, to frame 106. A second edge 119 of element 112 is affixed to sub-frame 110.

When the pressure within cavity 29 is increased by a high pressure pulse generated by driving circuit 24 then element 112 is distorted so that edge 118 moves away from edge 119. This lifts frame 106 away from sub-frame 110. After the water hammer pressure pulse has passed, frame 106 settles back down towards sub-frame 110 under the action of gravity and the natural tendency of deformable element 112 to return to its equilibrium configuration. Deformable element 112 may be in the form of a long channel which extends for a distance between the edges of frame 106 and sub-frame 110.

The continuous series of water hammer pulses generated by hydraulic driving circuit 24 causes frame 106 and mesh 104 to vibrate. A hopper 120 containing a mixture of coarse and fine particles 122 delivers a stream of mixed coarse and fine particles onto mesh 104. Fine particles 124 are shaken through mesh 104 and can be collected. Coarser particles shake off the end of mesh 104 where they also can be collected.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method for shaking a structure relative to a member said method comprising the steps of:
   (a) providing a driving system and a deformable hollow element, said driving system comprising:
   i) a conduit having an inlet and an outlet;
   ii) a source of pressurized fluid having an output pressure, connected to said inlet;
   iii) a valve in said conduit;

iv) a valve actuator associated with said valve for repeatedly opening and closing said valve; and said hollow element comprising a deformable wall enclosing a fluid-filled cavity and first and second mounting points on said deformable wall, wherein a change in a fluid pressure in said fluid-filled cavity, causes said second mounting point to move relative to said first mounting point;

(b) connecting said first mounting point to a structure to be vibrated relative to a member and connecting said second mounting point to said member;

(c) opening said valve and holding said valve open until said fluid flows through said conduit with a velocity sufficient to create a water hammer within said conduit;

(d) suddenly closing said valve to create a water hammer within said conduit, said water hammer comprising a pressure pulse having a pressure significantly greater than said output pressure;

(e) allowing said water hammer pressure pulse to propagate into said cavity in said hollow element to increase said fluid pressure inside said cavity;

(f) allowing said change in said fluid pressure in said cavity to cause said first mounting point to move relative to said second mounting point, thereby moving said structure relative to said member; and (g) repeating said steps (c), (d), (e) and (f) to cause said structure to shake relative to said member wherein said cavity is connected to said conduit by a branch conduit and said step of allowing said water hammer pressure pulse to propagate into said fluid filled cavity comprises allowing said water hammer pulse to propagate through said branch conduit into said cavity and wherein said step of holding said valve open until said fluid flows through said conduit with a velocity sufficient to create a water hammer within said conduit comprises reducing said fluid pressure in said cavity by allowing said fluid to flow through an aspirator in said conduit, said aspirator connected to said branch conduit.

2. The method of claim 1 wherein said structure comprises a screen and said shaking causes said screen to vibrate.

3. The method of claim 1 wherein said member is connected to a fixed object.

4. A method for shaking a structure relative to a member said method comprising the steps of:

(a) providing a driving system and a deformable hollow element, said driving system comprising:
  i) a conduit having an inlet and an outlet;
  ii) a source of pressurized fluid having an output pressure, connected to said inlet;
  iii) a valve in said conduit;
  iv) a valve actuator associated with said valve for repeatedly opening and closing said valve; and said hollow element comprising a deformable wall enclosing a fluid-filled cavity and first and second mounting points on said deformable wall, wherein a change in a fluid pressure in said fluid-filled cavity causes said second mounting point to move relative to said first mounting point;

(b) connecting said first mounting point to a structure to be vibrated relative to a member and connecting said second mounting point to said member;

(c) opening said valve and holding said valve open until said fluid flows through said conduit with a velocity sufficient to create a water hammer within said conduit;

(d) suddenly closing said valve to create a water hammer within said conduit, said water hammer comprising a pressure pulse having a pressure significantly greater than said output pressure;

(e) allowing said water hammer pressure pulse to propagate into said cavity in said hollow element to increase said fluid pressure inside said cavity;

(f) allowing said change in said fluid pressure in said cavity to cause said first mounting point to move relative to said second mounting point, thereby moving said structure relative to said member; and (g) repeating said steps (c), (d), (e) and (f) to cause said structure to shake relative to said member wherein said cavity is connected to said conduit by a branch conduit and said step of allowing said water hammer pressure pulse to propagate into said fluid filled cavity comprises allowing said water hammer pulse to propagate through said branch conduit into said cavity and said hollow element comprises a flexible concave wall and a flexible convex wall and said fluid-filled cavity occupies a space between said concave and convex walls, said space being U-shaped in section.

5. The method of claim 4 wherein said first and second mounting points are respectively on end portions of opposed arms of said U-shaped section.

6. The method of claim 5 wherein said structure comprises a screen and said a shaking vibrates said screen.

7. The method of claim 6 wherein said fluid filled cavity comprises an elongated cavity extending between a frame supporting said screen and a sub-frame.

8. The method of claim 4 wherein said cavity comprises a portion which is a thin crescent-shape in section.

* * * * *